(12) United States Patent
Edvardson

(10) Patent No.: US 12,236,484 B2
(45) Date of Patent: Feb. 25, 2025

(54) ORDER MATCHING

(71) Applicant: NASDAQ TECHNOLOGY AB, Stockholm (SE)

(72) Inventor: Hannes Jörgen Edvardson, Uppsala (SE)

(73) Assignee: Nasdaq Technology AB, Stockholm (SE)

( * ) Notice: Subject to any disclaimer, the term of this patent is extended or adjusted under 35 U.S.C. 154(b) by 893 days.

(21) Appl. No.: 17/149,508

(22) Filed: Jan. 14, 2021

(65) Prior Publication Data

US 2021/0209690 A1 Jul. 8, 2021

Related U.S. Application Data

(63) Continuation of application No. 13/520,362, filed as application No. PCT/EP2011/050072 on Jan. 4, 2011, now abandoned.

(30) Foreign Application Priority Data

Jan. 4, 2010 (EP) .................................... 10150065
Jan. 4, 2010 (GB) .................................... 1000047

(51) Int. Cl.
*G06Q 40/06* (2012.01)
*G06Q 40/04* (2012.01)

(52) U.S. Cl.
CPC ............. *G06Q 40/06* (2013.01); *G06Q 40/04* (2013.01)

(58) Field of Classification Search
CPC ........ G06Q 40/00; G06Q 40/06; G06Q 30/08; G06Q 40/04
See application file for complete search history.

(56) References Cited

U.S. PATENT DOCUMENTS

| 4,805,136 A | 2/1989 | Morino et al. |
| 7,010,505 B2 | 3/2006 | Boutilier et al. |
(Continued)

FOREIGN PATENT DOCUMENTS

| WO | 01/84419 | 11/2001 |
| WO | 2005/013041 | 2/2005 |

OTHER PUBLICATIONS

U.S. Appl. No. 13/520,362, filed Sep. 21, 2012, Edvardson.
Decision on Appeal dated Nov. 16, 2020 for U.S. Appl. No. 13/520,362, 15 pages.
Examiner's Answer dated Mar. 8, 2019 for U.S. Appl. No. 13/520,362, 8 pages.

(Continued)

*Primary Examiner* — Daniel S Felten
(74) *Attorney, Agent, or Firm* — NIXON & VANDERHYE P.C.

(57) ABSTRACT

An automated trading system, comprising an interface for receiving a plurality of orders comprising bid orders and ask orders; and a trading module for matching the bid orders and the ask orders, the trading module comprising a memory for storing the plurality of orders; a subset sum module configured to find the subset sums of the bid orders and the subset sums of the ask orders of the plurality of orders; and an order matching module for matching a combination of bid orders to a combination of ask orders based on the subset sums for the bid orders and the subset sums of the ask orders, wherein the subset sum module is configured to find the subset sums of a set of orders by considering a first set of orders, determining the subset sums of the first set of orders, considering a second set of orders wherein the second set of orders comprises at least one more order than the first set of orders and determining the subset sums of the second set of orders by using the determined subset suns of the first set of orders.

20 Claims, 10 Drawing Sheets

(56) References Cited

U.S. PATENT DOCUMENTS

| | | | |
|---|---|---|---|
| 7,231,365 B2 | 6/2007 | Kashima et al. | |
| 7,552,083 B2* | 6/2009 | Carone | G06Q 30/08 705/37 |
| 7,571,135 B2* | 8/2009 | Burkhardt | G06Q 40/06 705/37 |
| 7,853,499 B2* | 12/2010 | Czupek | G06Q 40/00 705/37 |
| 8,108,299 B1* | 1/2012 | Waelbroeck | G06Q 40/04 705/37 |
| 8,296,218 B2* | 10/2012 | Tilly | G06Q 40/06 705/37 |
| 8,566,218 B2* | 10/2013 | Czupek | G06Q 40/00 705/37 |
| 9,172,738 B1* | 10/2015 | daCosta | G06Q 30/0601 |
| 11,151,650 B2* | 10/2021 | Smith | G06Q 40/04 |
| 2003/0028475 A1 | 2/2003 | Boutilier et al. | |
| 2003/0033236 A1 | 2/2003 | Davenport et al. | |
| 2004/0088241 A1 | 5/2004 | Rebane et al. | |
| 2005/0137959 A1 | 6/2005 | Yan et al. | |
| 2008/0114661 A1 | 3/2008 | Byde et al. | |
| 2009/0037317 A1 | 2/2009 | Zhou et al. | |
| 2010/0088216 A1 | 4/2010 | Czupek et al. | |
| 2012/0296824 A1* | 11/2012 | Rosano | G06Q 20/102 705/44 |
| 2012/0310826 A1* | 12/2012 | Chatterjee | G06Q 20/36 705/41 |
| 2012/0316992 A1* | 12/2012 | Oborne | G06Q 20/384 705/26.41 |
| 2013/0246125 A1* | 9/2013 | DiGioacchino | G06Q 30/0201 705/7.33 |
| 2023/0098915 A1* | 3/2023 | Driscoll | G06Q 40/00 705/37 |

OTHER PUBLICATIONS

Final Office Action dated Oct. 31, 2017 for U.S. Appl. No. 13/520,362, 8 pages.
Final Office Action dated Feb. 17, 2017 for U.S. Appl. No. 13/520,362, 10 pages.
Office Action dated May 19, 2016 for U.S. Appl. No. 13/520,362, 7 pages.
Final Office Action dated Mar. 4, 2015 for U.S. Appl. No. 13/520,362, 11 pages.
Office Action dated Jul. 8, 2014 for U.S. Appl. No. 13/520,362, 7 pages.
International Search Report from the European Patent Office in PCT/EP2011/050072 mailed on Feb. 21, 2011, 2 pages.
Pisinger, David, "Dynamic Programming on the Word RAM" pp. 1-20 (2000).
Kellerer et al, "Knapsack Problems" $1^{st}$ Edition, pp. 487-491 (Feb. 20, 2004).
London Stock Exchange, "Guide to the New Trading System" Issue 5.0, 48 pages (Jul. 19, 2010).
"Subset Sum Problem" http://en.wikipedia.org/wiki/Subset_sum, 4 pages (printed Sep. 9, 2010).
Report Under Section 17(5)(b) issued by the UK Intellectual Property Office in Application No. GB 1000047.9 on Apr. 28, 2010, 3 pages.
Wikipedia-Definition of "Trade" (https://en.wikipedia.org/wiki/Trade).
Wikipedia-Definition of "Dynamic programming" (https://en.wikipedia.org/wiki/Dynamic_programming).
Wikipedia-Definition of "Computational complexity theory" (https://en.wikipedia.org/wiki/Computational_complexity_theory).

* cited by examiner

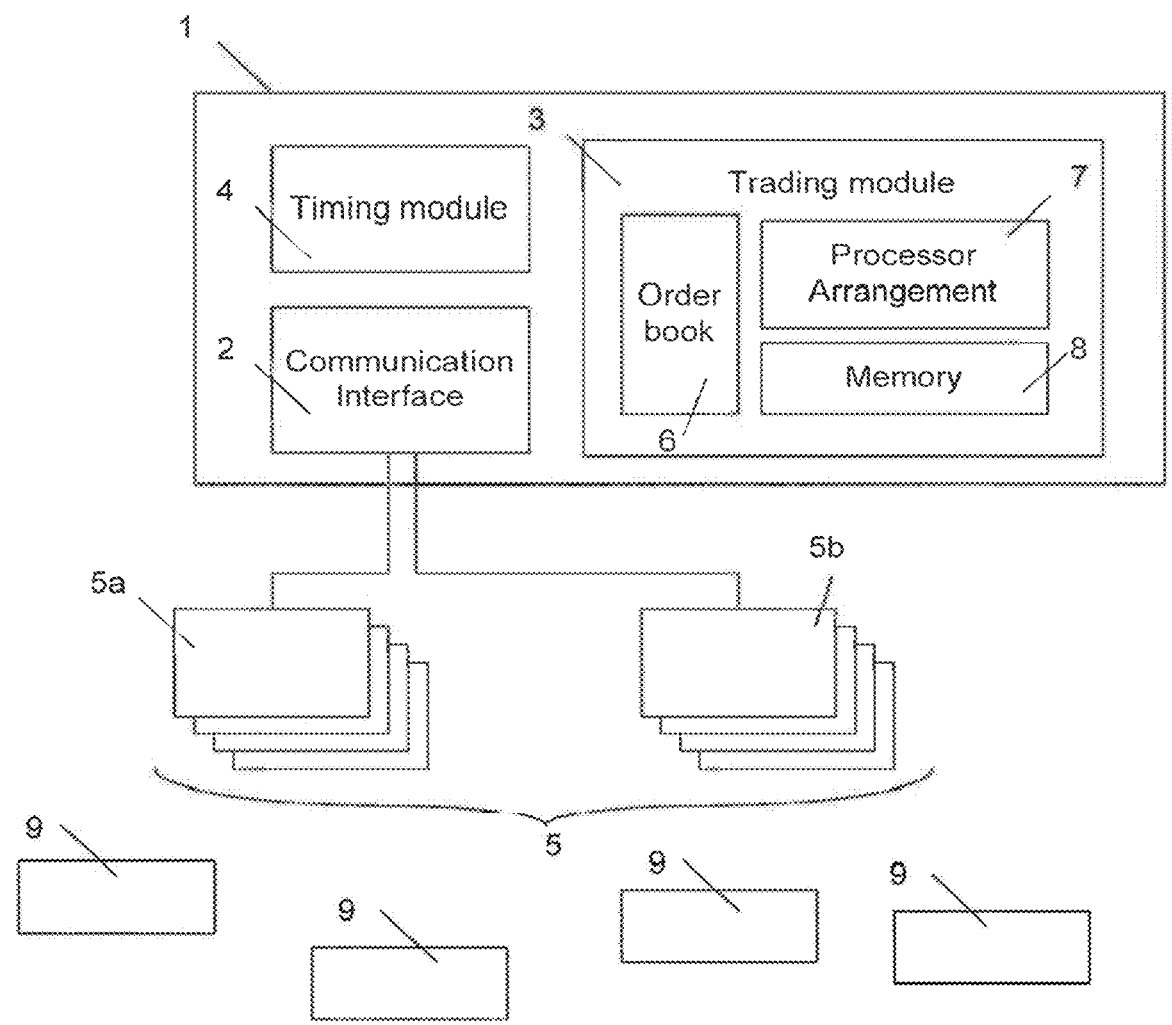
Fig. 1
Fig. 2
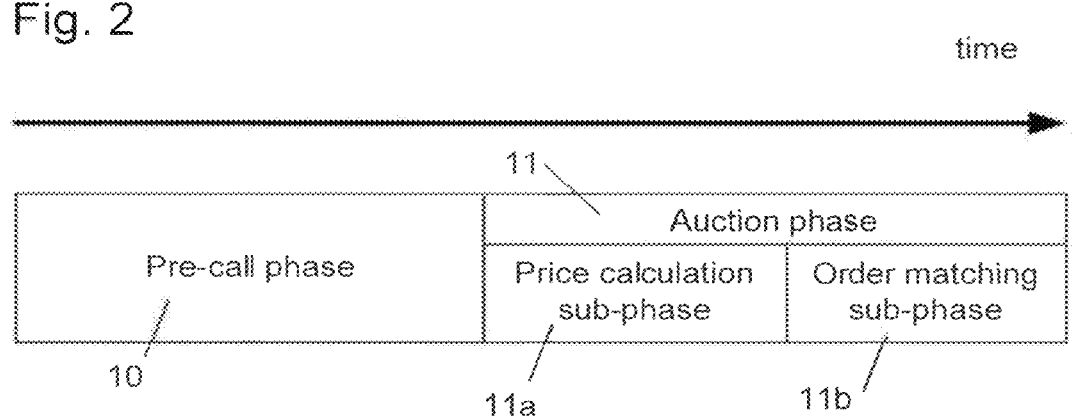

| Order no. | Volume | Price |
|---|---|---|
| 1 | 3 | 10000 |
| 2 | 2 | 10000 |
| 3 | 7 | 10000 |
Fig. 4a
| Order no. | Volume | Price |
|---|---|---|
| 1 | 5 | 10000 |
| 2 | 3 | 10000 |
| 3 | 6 | 10000 |
Fig. 4b
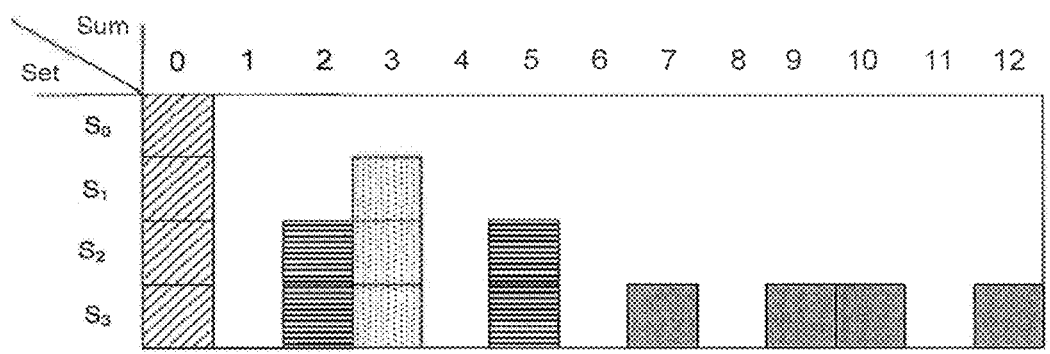
Fig. 5a
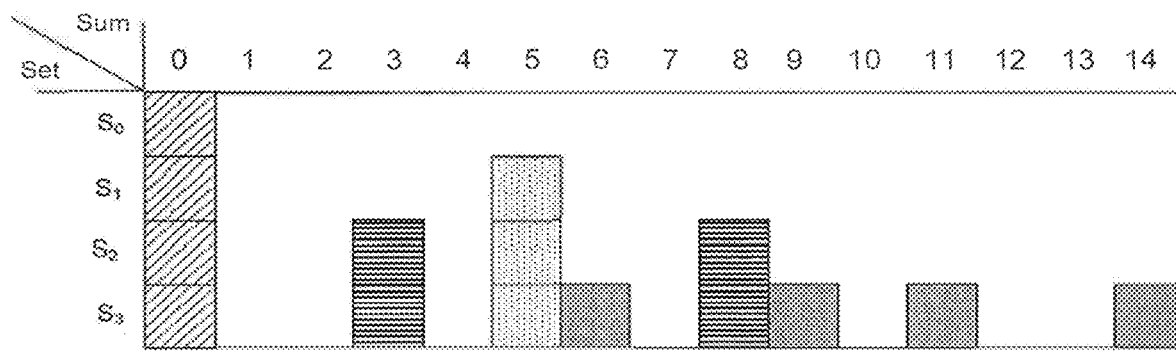
Fig. 5b

| Order no. | Volume | Price |
|---|---|---|
| 1 | 2 | 10300 |
| 2 | 7 | 10200 |
| 3 | 3 | 10000 |
Fig. 6a
| Order no. | Volume | Price |
|---|---|---|
| 1 | 6 | 9700 |
| 2 | 5 | 9800 |
| 3 | 3 | 9900 |
Fig. 6b
| Price | Bid | Ask | Turnover | Imbalance |
|---|---|---|---|---|
| 10300 | 2 | 14 | 0 | 0 |
| 10200 | 9 | 14 | 9 | 0 |
| 10100 | 9 | 14 | 9 | 0 |
| 10000 | 12 | 14 | 9 | 0 |
| 9900 | 12 | 14 | 9 | 0 |
| 9800 | 12 | 11 | 5 | 0 |
| 9700 | 12 | 6 | 0 | 0 |
Fig. 7
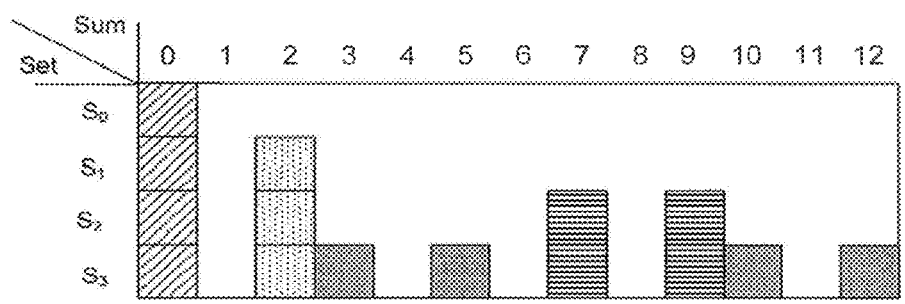
Fig. 8a
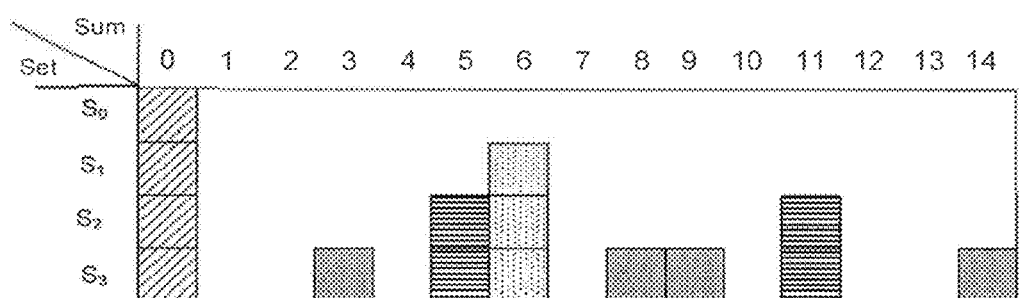
Fig. 8b

| Order no. | Volume | Type | Min. Vol. | Price |
|---|---|---|---|---|
| 1 | 6 | Min vol | 4 | 10500 |
| 2 | 5 | AoN | 5 | 10200 |
| 3 | 15 | Min Vol | 10 | 9900 |

Fig. 12

| Set \ Sum value | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|---|
| $S_0$ | X | | | | | | | | | | | | | | | | | | | | | | | | | | |
| $S_1$ | X | | | | X | X | X | | | | | | | | | | | | | | | | | | | | |
| $S_2$ | X | | | | X | X | X | | | X | X | X | | | | | | | | | | | | | | | |
| $S_3$ | X | | | | X | X | X | | | X | X | X | | | X | X | X | X | X | X | X | X | X | X | X | X | X |

Fig. 13

ORDER MATCHING

CROSS-REFERENCE TO RELATED APPLICATIONS

This application is a continuation of U.S. patent application Ser. No. 13/520,362, filed on Sep. 21, 2012, which is a U.S. National Stage entry of PCT/EP2011/050072, filed Jan. 4, 2011, which claims the benefit of foreign priority to EP application Ser. No. 10/150,065.0, filed on Jan. 4, 2010, and GB Application No. 1000047.9, filed on Jan. 4, 2010, all of which are incorporated herein by reference.

FIELD OF THE INVENTION

The invention relates to a trading system for matching orders using a dynamic programming algorithm.

BACKGROUND OF THE INVENTION

Automated trading systems receive bid orders and ask orders and match the bid orders and the ask orders to create trades. Depending on the conditions associated with the orders, the process of matching bid orders and ask order can sometimes be complex.

An automated trading system may run call auctions, where the auction is held open to receive orders until a certain time and the orders are then matched after the auction has closed. Matching the orders often involves determining an equilibrium price for the orders and matching the orders willing to trade at the equilibrium price. It is desired to choose an equilibrium price that maximises the turnover Some systems allow members to submit orders with minimum volume conditions. One type of minimum volume order condition is an All-or-None (AoN) order, meaning that either the bid is matched completely or the member does not want to trade. For example, if the order book of the trading system only comprises an AoN bid order of volume 4 and an AoN ask order of volume 6, a trade cannot be created. However, if the order book comprises two AoN bid orders of volume 4 and 5 respectively and two AoN ask orders of volume 3 and 6 respectively, the two bid orders can be combined and the two ask orders can be combined and all the orders can trade.

For a large number of orders, it can sometimes be difficult to find a combination of bid orders that match a combination of ask orders. In order to maximise the turnover, it is desired to find the largest common sum of the ask orders and the bid orders. In other words, given the set of ask orders $S_a$ and the set of bid orders $S_i$, where $S_a=\{a_1, a_2, \ldots, a_n\}$, $S_b=\{b_1, b_2, \ldots, b_m\}$, where $a_i$ and $b_i$ are a non-negative numbers, it is desired to find a subset $\overline{S}_a$ of $S_a$ and a subset $\overline{S}_b$ of $S_b$ such that $\overline{S}_a$ and $\overline{S}_b$ are maximised, subject to the constraint $\Sigma_{\overline{S}_a} a_i = \Sigma_{\overline{S}_b} b_i$. The problem that has to be solved for each set of orders is known as the subset sum problem and is a so-called NP-hard problem which means that no known algorithms have a complexity order lower than exponential complexity in terms of number of elements in the set. In practice this means that the problem complexity grows very fast as more orders are present in the calculations.

The problem is exasperated if members are allowed to submit more generalised minimum volume conditions. For example, a member may submit an order of a specific total volume accompanied with a condition specifying the minimum volume of the total volume that the member is willing to accept. For example, a member may submit a bid order of volume 100, with a minimum volume condition of 40. If the order book includes a matching ask order of volume 50, a trade is created for volume 50, because 50 is higher than the minimum volume condition of the bid order.

It is often desired to apply special rules to minimum volume condition orders. The rules may include rules that do not guarantee priority to minimum volume condition orders over orders with less generous prices. In more detail, for orders without volume conditions, a bid order with a high price must always be executed before a bid order with a lower price. Since the minimum volume conditions may prevent matching, this rule must be changed to allow for exceptions for minimum volume orders. Because of the larger number of different possible volume-, allowed by minimum volume condition orders, and the rules that need to be followed, minimum volume condition orders make it more complicated to match bid and ask orders.

Several trading systems offer matching of AoN orders and minimum volume conditions orders. However, the complexity of finding the optimal solution forces the systems to settle with a suboptimal solution, either by stopping the optimisation after a configurable number of steps or by implementing a "best effort" algorithm which does not guarantee the optimal solution but guarantees a result within a reasonable time.

Additionally, many of the known trading systems do not include orders with minimum volume conditions in the calculation of the equilibrium price. Instead, the equilibrium price is typically calculated from the set of orders without minimum volume conditions, and the orders with minimum volume conditions are then matched with a best effort algorithm that takes the equilibrium price as input. The problem with this approach is that minimum volume conditions are usually applied to large orders. If the equilibrium price is only based on small orders, it does not reflect the true market situation.

Dynamic programming is a method of solving complex problems by breaking them down into simpler subproblems in a recursive manner. If a certain calculation is a subproblem in a larger calculation, the result of the calculation can be stored and re-used in the larger calculation.

Dynamic programming on the word RAM by D. Pisinger, Algorithmica, 35:128-145, 2003, discloses a dynamic programming algorithm for solving a subset sum problem.

The invention was made in this context.

SUMMARY OF THE INVENTION

According to the invention, there is provided an automated trading system comprising an interface for receiving a plurality of orders comprising bid orders and ask orders; and a trading module for matching the bid orders and the ask orders, the trading module comprising a memory for storing the plurality of received orders; a subset sum module configured to find the subset sums of the bid orders and the subset sums of the ask orders; and an order matching module for matching a combination of bid orders with a combination of ask orders based on the subset sums of the bid orders and the subset sums of the ask orders, wherein the subset sum module is configured to find the subset sums of a set or orders by considering a first set of orders, determining the subset sums of the first set of orders, considering a second set of orders wherein the second set of orders comprises at least one more order than the first set of orders and determining the subset sums of the second set of orders by using the determined subset sums of the first set of orders.

The set of orders may comprise orders $a_i$ with minimum volume conditions $c_i$, and the subset sum module may be configured to determine a value $g_{i,j}$ indicating whether a set $S_i=\{a_1, \ldots a_i\}$ comprises a subset that sums to value j by noting that set $S_j=\{a_1, \ldots, a_i\}$ has a subset that sums to j, if $S_{i,j}$ has a subset that sums to j or if $S_{j,i}$ has a subset that sums to j·k, where $c_i \le k \le a_i$. The minimum volume condition orders can comprise one or more AoN orders, for which $k=a_i=c_i$.

The subset sum module may be arranged to construct a matrix in which every row correspond to a set of orders, $S_{i,j}$, every column corresponds to a subset sum j and the element at a particular position i,j indicates whether the set $S_i$ has a subset summing to sum j and the subset sum module may be configured to populate a row by considering a set of orders comprising one more order than the set of orders corresponding to the previous row and using the value of the elements of the previous row.

If said one more order is an AoN order, the subset sum module may be configured to add a first copy of the previous row to the new row; and add a second copy of the previous row, shifted a number of columns corresponding to the volume of said one more order, to the new row.

If the one more order can be any minimum volume condition order, the subset sum module may be configured to add a first copy of the previous row to the new row; add a second copy of the previous row, shifted a number of columns corresponding to a possible volume of said one more order and spread to represent all the possible volumes of the order, to the new row.

The second copy may be shifted a number of columns corresponding to the minimum volume of said one more orders and the subset module may be configured to add the second copy, shifted said number of columns, to a temporary row; set element $g_{i,j}$ in the temporary row to indicate that j is a subset sum if $g_{i,j-m}$ of the second copy of the previous row, shifted said number of columns, indicates that j−m is a subset sum of the previous row, where m is an integer and $0 < m \le a_i \cdot c_i$.

When all orders have been added and all row have been populated, the final row in the matrix has elements set that indicate the volumes that can be attained in the complete set of orders. Consequently, the invention allows the subset sum problem to be solved comparatively fast. The heart of the algorithm and the reason for its speed can be considered to be that the algorithm works on the set of volume sums instead of on the set of element subsets. The algorithm can be considered to be a pseudo polynomial algorithm.

If $g_{i,j}=1$ indicates that the set $S_i$ has a subset that sums to j and $g_{i,j}=0$ indicates that the set $S_j$ does not have a subset that sums to j, the subset sum module may be configured to populate the rows of the matrix by setting $g_{0,j}=1$ for j=0 and $g_{0,j}=0$ for j>0 and using the recursion $g_{i,j}=1$ iff ($g_{i-1,j}=1$ or $g_{i-1,j-a_i}=1$).

If $g_{i,j}=1$ indicates that the set $S_j$ has a subset that sums to j and $g_{i,j}=0$ indicates that the set $S_i$ does not have a subset that sums to j, and the subset sum module may be configured to populate the rows of the matrix by setting $g_{0,1}=1$ for j=0 and $g_{0,j}=0$ for j>0 and use the recursion $g_{i,j}=1$ iff ($g_{i-1,j}=1$ or $g_{i-1,j-c_i}=1$) where $c_i \le k \le a_i$.

The automated trading system may further comprise mean for ordering the orders into a sequence with respect to price and the subset sum module may be configured to select said one more order as the next order in the sequence.

The trading module may further comprise means for finding the highest common sum of said subset sums for the bid orders and said subset sums for the set of ask orders and the order matching module may be configured to determine a combination of bid orders and a combination of ask orders that sum to the highest common sum.

Consequently, the invention allows the turnover to be maximised by fully solving the subset sum problems for the bid and ask orders.

The order matching module nay further be configured to find, from the set of orders, a solution subset that sums to the highest common sum by
a) setting parameter V equal to the highest common sum;
b) finding the one more order added to form the set corresponding to the lowest row in the matrix with subset sum V,
c) adding this order to the solution subset;
d) determining the volume of said one more order that is allowed to trade and the volume $V_{next}$ that remains after said one more order is allowed to trade the determined volume;
e) setting $V=V-V_{next}$
f) repeating steps b) to e) until V=0.

Consequently, the automated trading system makes sure that the same subset is always found given a matrix and a specific sum.

The trading module may be configured to determine the volume that is allowed to trade such that the volume that remains is maximised. To this end, the trading module may select the smallest volume possible for the order to trade while still ensuring that the combination of volumes that are allowed to trade sums to the highest common sum. Consequently, the volume that remains for orders with higher priority is maximised. To find the smallest possible volume of the order $a_i$ that is allowed to trade, the trading module may determine the volume $v_{max}$ of the full order $a_i$, the volume $v_{min}$ of the minimum volume condition $c_j$, and the difference $v_{slack}$ between $v_{max}$ and $v_{min}$. The trading module then examines the columns in the interval $[v-(v_{min}+v_{slack}), v-v_{min}]$ on the row immediately above the current row and selects the highest subset sum $V_{next}$ in these columns.

The automated trading system may further comprise an equilibrium price calculation module configured to determine the turnover at each possible price based on the subset sum matrix.

The interface may be configured to receive the plurality if orders from a plurality of member terminals, the order matching module may be configured to create trades between said combination of bid orders and said combination of ask orders; and the interface may further be configured to communicate information about the matched orders that are allowed to trade to said member terminals.

According to the invention, there is also provided a method for matching orders in an automated trading system comprising: receiving a plurality of orders in an automated trading system, the plurality of orders comprising bid orders and ask orders; storing the plurality of orders submitted to the system in an order book; determining the subset suns of a set of orders corresponding to the bid orders and determining the subset sums of a set of orders corresponding to the ask orders; and matching a combination of bid orders with a combination of ask orders based on the determined subset sums for the bid orders and the subset sums for the ask orders, wherein determining the subset sums of a set of orders comprises determining the subset sums of a first set of orders, considering a second set of orders wherein the second set of orders comprises at least one more orders than the first set of orders, and determining the subset sums of the second set of orders by using the determined subset sums of the first set of orders.

The set of orders may comprise orders $a_i$ with a minimum volume conditions $c_i$, and determining the subset sum of a set of orders may comprise determining a value $g_{i,j}$ indicating whether a set $S_i=\{a_1, \ldots, a_i\}$ comprises a subset that sums to value j by noting that set $S_i=\{a_1, \ldots, a_i\}$ has a subset that sums to j, if $S_{i-1}$ has a subset that sums to j or if $S_{i-1}$ has a subset that sums to j−k, where $c_i \le k \le a_i$. The minimum volume conditions orders may comprise at least one All-or-None (AoN) order, wherein $k=a_i=c_i$.

Determining the subset sum of a set of orders may comprise constructing a matrix in which every row correspond to a set of orders, $S_{i,j}$ every column corresponds to a subset sum j and the element at a particular position i,j indicates whether the set $S_i$ has a subset summing to value j, and populating a new row by considering a set of orders comprising one more order than the set of orders corresponding to the previous row and using the values of the elements of the previous row.

If said one more order is an AoN order, populating said new row may comprises adding a first copy of the previous row to said new row, adding a second copy of the previous row, shifted a number of columns corresponding to the volume of said one more order, to the new row.

When the one more order can be any minimum volume condition order, populating said new row may comprise adding a first copy of the previous row to said new row, adding a second copy of the previous row, shifted a number of columns corresponding to a possible volume of said one more order and smeared to represent all the possible volumes of the order, to the new row.

The second copy may be shifted a number of columns corresponding to the minimum volume of said one more order and populating said row may further comprise adding the second copy, shifted said number of columns, to a temporary row; setting element $g_{i,j}$ in the temporary row to indicate that j is a subset sum if $g_{i,j,m}$ of the second copy of the previous row, shifted said number of columns, indicates that j·m is a subset sum of the previous row, where m is an integer and $0 < m \le a_i - c_i$.

Populating said row may comprise setting $g_{0,j}=1$ for j=0 and $g_{0,j}=0$ for j>0 and using the recursion $g_{i,j}=1$ iff ($g_{i-1,j}=1$ or $g_{i-1,j-a}=1$), where $g_{i,j}=1$ indicates that the set $S_i$ has a subset that sums to j and $g_{i,j}=0$ indicates that the set $S_i$ does not have a subset that sums to j.

Populating said row may comprise setting $g_{0,j}=1$ for j=0 and $g_{0,j}=0$ for j>0 and using the recursion $g_{i,j}=1$ iff ($g_{i-1,j}=1$ or $g_{i-1,j-k}=1$) where $c_i \le k \le a_j$, and $g_{i,j}=1$ indicates that the set $S_i$ has a subset that sums to j and $g_{i,j}=0$ indicates that the set $S_i$ does not have a subset that sums to j.

The method may further comprise ordering the orders in terms of price into a sequence and selecting said one more order as the next order in the sequence.

Matching a combination of bid orders with a combination of ask orders may comprise determining the highest common sum of said subset sums for the hid orders and said subset sums for the ask orders.

Matching a combination of bid orders with a combination of ask orders may further comprise determining, from the set of orders, the solution subset that sums to the highest common sum by a) setting parameter V equal to the highest common sum;
b) finding the one more order added to form the set corresponding to the lowest row in the matrix with subset sum v,
c) adding this order to the solution subset;
d) determining the volume of said one more order that is allowed to trade and the volute $V_{next}$ that remains after said one more order is allowed to trade the determined volume;
e) setting $V=V-V_{next}$
f) repeating steps b) to c) until V=0.

The trading module may be configured to determine the volume that is allowed to trade such that the volume that remains is maximised.

The method may further comprise determining the turnover at each equilibrium price of a set of orders based on the constructed matrix.

In some embodiments, receiving a plurality of orders may comprise receiving a plurality of orders from a plurality of member terminals, the method may further comprise creating trades between the combination of ask orders and the combination of bid orders and communicating information about the matched orders that are allowed to trade to said member terminals.

According to the invention, there is also provided a computer program comprising instructions that when executed by a processor arrangement cause the processor arrangement to carry out the above method.

BRIEF DESCRIPTION OF THE DRAWINGS

Embodiments of the invention will now be described, by way of example, with reference to the accompanying drawings, in which:

FIG. 1 is schematic diagram illustrating components of an automated trading system;

FIG. 2 is a schematic diagram illustrating the different phases of a call-auction;

FIGS. 4a and 4b show an example of the bid orders and ask orders that can be stored by an order book of the trading system;

FIGS. 5a and 5b illustrate two tables for solving the subset sum problems for the bid orders and the ask orders of FIGS. 4a and 4b;

FIGS. 6a and 6b show another example of bid orders and ask orders that can be stored by an order book of the trading system;

FIG. 7 shows a table for calculating the equilibrium price for the orders of FIGS. 6a and 6b;

FIGS. 8a and 8b show two tables for solving the subset sum problems for the bid orders and the ask orders of FIGS. 6a and 6b;

FIG. 12 shows a third example of orders that can be stored by an order book of the trading system;

FIG. 13 shows a table for solving the subset sum problems for the orders of FIG. 13;

DETAILED DESCRIPTION

Figure 3:
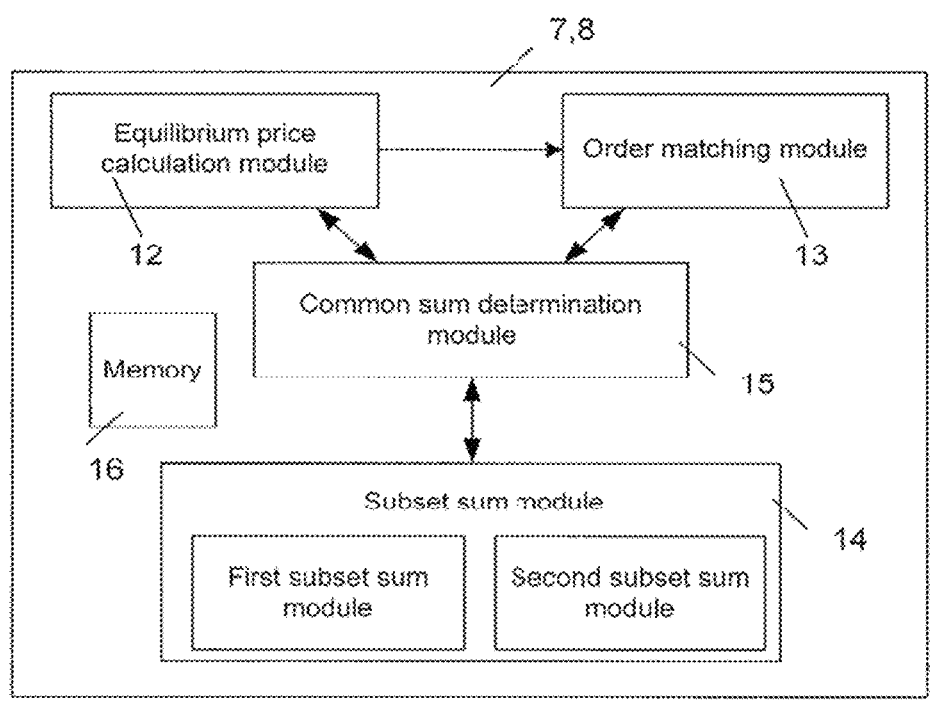
FIG. 3 is a schematic diagram illustrating different modules of a trading module of the automated trading system.

With reference to FIG. 1, an electronic automated trading system 1 is shown comprising an interface 2 for communicating with market members, a trading module 3, and a timing module 4. The market members submit ask and bid orders 5a, 5b to the automated trading system 1 and if one or more of the ask orders match one or more of the bid orders, a trade is created. The electronic automated trading system 1 may also use the interface 2 to inform the market members once a trade is created. The trading module 3 comprises an order book 6 for storing orders received from the market members via the interface 2. The trading module 3 further comprises a processing arrangement 7 for matching the orders and creating the trades and a memory 8. For storing program code and data. The processing arrangement 7 may match the orders and create the trades by executing program code stored in memory 8. The order book 6 may be implemented in memory, which forms part of, or is separate from, the memory shown in FIG. 1. The automated trading system may also comprise, for example, a database for storing details of market members, an interface to a clearing system and a further memory storing settings (not shown).

The market members may submit the orders using a number of member terminals 9 and the interface 2 may receive the orders from the member terminals 9. The orders may be received from the member terminals via a communication network. The member terminals may for example be desktop computers but any suitable device is contemplated. Information indicating that submitted orders have been matched may be sent over the communication network to the member terminals 9 and displayed on the member terminals. The automated trading system 1 may further pass on information about the matched orders to a clearing system to allow trades resulting from the matched orders to be cleared and settled.

According to some embodiments, the trading system allows the market members to trade using a call auction. With reference to FIG. 2, a call auction comprises two main phases 10, 11. In the first phase 10, which will hereinafter be referred to as the pre-call phase, the system receives and stores one or more bid orders 5a and one or more ask orders 5b from the market members, without matching the bid and ask orders. The orders are received through the interface 2 and stored in the order book 6. This phase continues until a specific time, as set by a timer of the timing module 4 of the trading system. In the second phase 11, which will hereinafter be referred to as the auction phase, the orders are matched. The second phase comprises two sub-phases. In the first sub-phase 11a, an equilibrium price is calculated. In the second sub-phase 11b, the orders that can be traded at the equilibrium price are matched and trades are created.

It is known how to receive and store orders and the pre-call phase will therefore not be described in detail herein. The auction phase will be described below.

With reference to FIG. 3, the processing arrangement 7 of the trading module 3 may access a number of software routines in memory 8 to carry the auction phase. In one embodiment, the processing arrangement 7 and the software routines can together be considered to make up a number of modules as shown in FIG. 3. The modules comprise an equilibrium price calculation module 12, an order matching module 13, a subset sum module 14, a common sum determination module 15 and a memory 16 for storing data. In some embodiments, the software routines may be implemented as object orientated programming and the modules can then be considered as different objects. Additionally, in some embodiments, the invention is implemented in hardware and the processors and the software routines may be replaced by dedicated hardware modules. The tasks carried out by the different modules will be described in more detail below.

As shown in FIGS. 4a and 4b, during the pre-call phase, bid orders of volumes 3, 2 and 7 and ask orders of volumes 5, 3 and 6 have been received in the automated trading system. All the orders are AoN orders. For the sake of simplicity, all the orders are at the same price and the equilibrium price is set to that price. This would not normally happen and a more realistic situation with orders at different prices will be described later.

To find the highest common sum of the bid orders and the ask orders, two subset sum problems have to be solved. According to the invention, a dynamic programming algorithm, in which the problem is broken down into smaller problem, is used to reduce the complexity of the calculations.

Starting with the bid orders, a table is constructed for determining the subset sums as shown in FIG. 5a. The problem is broken down such that the subsets sums are recursively calculated for larger and larger sets of orders. To that end, each row in the table represents a set of orders $S_i=\{a_1, \ldots, a_i\}$ and each column in the row represents a sum of a particular subset of the set of orders for that row. A set of orders corresponding to a row comprises one more order than the set of orders corresponding to the previous row. The orders are arranged in a particular sequence and the next order in the sequence in added to the set of the previous row to form the set of a new row. The orders may be ordered according to the time at which they were received by the trading system. The last row shows the subset sums for a set of orders $S_n$ comprising all bid orders. The table can be constructed by the subset sum module 14 of FIG. 3.

To construct the table, the full set of orders $S_i=\{0, 3, 2, 7\}$ where $a_0=0$, $a_1=3$, $a_2=2$ and $a_3=7$ is considered. The first set corresponding to the first row is selected as the empty set, with i=0. This set, $S_0=\{a_0\}$, oily comprise $a_0=0$. The only sum for this set is therefore 0, as shown in FIG. 5a. The second set comprises elements with i=0 and i=1, i.e. set $S_1=\{0, 3\}$. This set comprises the subset sums of the previous set, i.e. the sum 0, and the subset sums created from adding the value of the new element to the subset sums of the previous set, in this case only 3. The second row of the matrix can therefore be constructed by copying the first row of the matrix plus adding a copy of the first row shifted three columns, i.e. the number of columns equal to the new element, $a_1$, in the set.

The third set is created by adding another element, $a_2=2$, to the set. The third set is therefore $S_2=\{0, 3, 2\}$. The third row of the matrix is constructed by again copying the previous row, the second row, and adding a copy of the previous row shifted a number of columns equal to the value of the order added to the set. As a result, the third row shows all the sums of all the subsets of the set $\{0, 3, 2\}$, namely 0, 2, 3 and 5.

Finally, the fourth set is created by adding the last element, $a_3=7$, to the set to form the full set $S_3=\{0, 3, 2, 7\}$ and the fourth row is created by copying the third row and adding another copy of the third row, shifted seven positions. The fourth row shows the sum of all the subsets of the full set $\{0, 3, 2, 7\}$, namely, 0, 2, 3, 5, 7, 9, 10 and 12.

Using a more mathematical notation, it can be seen from FIG. 5a, that a set $S_i=\{a_1, \ldots, a_i\}$ has a subset that sums to j, if $S_{i,j}$ has a subset that sums to i or if $S_{i,j}$ has a subset that sums to the difference between j and the volume of $a_i$, $j-a_i$.

If $g_{i,j}$ denotes whether a set $S_i$ has a subset that sums to j and $g_{i,j}=1$ indicates that the set $S_i$ has a subset that sums to j and $g_{i,j}=0$ indicates that the set $S_i$ does not have a subset that sums to j, the solution of $g_{i,j}$ is found by noting the initial state $g_{i,j}=1$ for $j=0$ and $g_{0,j}=0$ for $j>0$ and using the recursion $$g_{i,j}=1 \mathit{iff}(g_{i-1,j}=1 \text{ or } g_{i-1,j-a}=1). \qquad \text{Equation 1}$$

Using this notation, the table of FIG. 5a can be transformed into its corresponding matrix:

$$G_b = \begin{pmatrix} 1 & 0 & 0 & 0 & 0 & 0 & 0 & 0 & 0 & 0 & 0 & 0 & 0 \\ 1 & 0 & 0 & 1 & 0 & 0 & 0 & 0 & 0 & 0 & 0 & 0 & 0 \\ 1 & 0 & 1 & 1 & 0 & 1 & 0 & 0 & 0 & 0 & 0 & 0 & 0 \\ 1 & 0 & 1 & 1 & 0 & 1 & 0 & 1 & 0 & 1 & 1 & 0 & 1 \end{pmatrix} \quad \text{Matrix 1}$$

A similar table to the one shown in FIG. 5a can be created for the ask orders, 5, 3 and 6 by starting the first row as the empty set with the sum 0, adding one more element to the set of the previous row to create a new row and populating the row by copying the previous row plus adding a copy of the previous row shifted a number of positions equal to the value of tbc order added to that row. Such a table is shown in FIG. 5b and the table and the corresponding matrix is shown below.

$$G_a = \begin{pmatrix} 1 & 0 & 0 & 0 & 0 & 0 & 0 & 0 & 0 & 0 & 0 & 0 & 0 & 0 \\ 1 & 0 & 0 & 0 & 0 & 1 & 0 & 0 & 0 & 0 & 0 & 0 & 0 & 0 \\ 1 & 0 & 0 & 1 & 0 & 1 & 0 & 0 & 1 & 0 & 0 & 0 & 0 & 0 \\ 1 & 0 & 0 & 1 & 0 & 1 & 1 & 0 & 1 & 1 & 0 & 1 & 0 & 0 & 1 \end{pmatrix} \quad \text{Matrix 2}$$

It is seen, from a quick comparison of the two matrices or the two tables, that the highest common subset sum is 9. The sum 9 is made up from bid orders 2 and 7 if and ask orders 3 and 6. Consequently, bid orders 2 and 7 will trade with ask orders 3 and 6 and bid order 3 and ask order 5 will be left in the order book 6. Of course, the subset sums can quickly be found for a set of three orders. However, with a large number of orders, the problem gets more and more complex.

The system can also handle orders comprising some AoN order and some orders without minimum volume conditions. Orders without volume conditions are not handled directly in the matrix but are treated as offset to the column numbers. Consequently, if the order book 6 also comprised a number of hid orders without minimum volume conditions with a total volume of 10, an offset of 10 is added to the subset sums and the sums of the last row in a matrix or a table for the orders of FIG. 4a would be 10, 12, 13, 15, 17, 19, 20 and 22, instead of 0, 2, 3, 5, 7, 9, 10 and 12.

Of course, in a more realistic situation, the bid orders and the ask orders will include orders at different prices. Using the same values for the volumes of the orders as in the previous examples, FIG. 6a show the first bid order as 3@10000 pence (p), the second bid order as 2@10300p and the third bid order as 7@10200p. FIG. 6b shows the first ask order as 5@9800p, the second ask order as 3@9900p and the third ask order as 6@970p.

The process needed for calculating the equilibrium price for a plurality of AoN orders with different prices, matching the orders and creating the trades will be described with respect to FIGS. 6 to 11.

It is desired to set the select the price that provides the highest turnover as the equilibrium price. A table is therefore constructed where every row represents a possible equilibrium price, as shown in FIG. 7 and for every row, all bid and ask orders that accept that price are collated and the turnover and the imbalance are calculated. For example, the first row corresponds to price 10300p. At that price, only the bid order 2@10200p would accept the price, but all the members that submitted ask orders would be willing to trade. If the members were prepared to sell at 9700p, 9800p and 9900 p, they would naturally also be prepared to sell at 10200p. Consequently, the sum of the total bid order volume is 2 and the sum of the total ask order volume is 14. The total bid and ask order volumes are calculated in a corresponding way for the other rows.

From the table in FIG. 7, it can be realised that the subset sum problems must be solved for the sets of orders willing to trade at each price. For example, in the first row, the total bid order volume is made up of a single AoN bid order of volume 2. The ask order with the lowest volume is the order with volume 3. There is therefore no matching order for the bid order of volume 2 and a trade cannot be created. The tables of FIGS. 5a and 5b solve the subset sum problem for the full sets of ask orders and bid orders and for some subsets of the orders, namely {0, 3} and {0, 3, 2} for the bid orders and {0, 5}, {0, 5, 3}. However, the tables of FIGS. 5a and 5b do not have a row corresponding to the bid order subset {7, 2} willing to trade at price 10200p and the ask order subset {6, 5} willing to trade at price 9800p. Separate subset sum matrices can then be calculated to solve this problem. However, according to some embodiments of the invention, the subsets $S_i$ of the original matrices are instead selected such that the solution to all subset sum problems necessary for calculating the equilibrium price as well as the orders willing to trade at the equilibrium price can be found in two matrices, one for the bid orders and one for the ask orders. This is done by ordering the bid orders by decreasing price, such that $a_0=0$, $a_1=2$, $a_2=7$ and $a_3=3$, and constructing a set corresponding to a new row in the bid matrix by adding the bid order of the next highest price. By selecting the sets in this way, all the combinations of the bid orders required for the equilibrium calculation can be determined from the single bid order matrix. Similarly, if the ask orders are ordered in order of increasing price, such that $a_0=0$, $a_1=6$, $a_2=5$ and $a_3=3$, and a new row in the ask matrix is created by adding the ask order of the next lowest price, all the combinations of the ask orders for the equilibrium calculation will be available from the single ask order matrix.

The re-calculated tables created when the orders are ordered according to price are shows in FIGS. 8a and 8b and will be described in more detail below. The overall process for matching orders and the detailed processes tor creating the subset sum matrices and for establishing an equilibrium prices will now be described with respect to FIGS. 9, 10 and 11.

Figure 9:
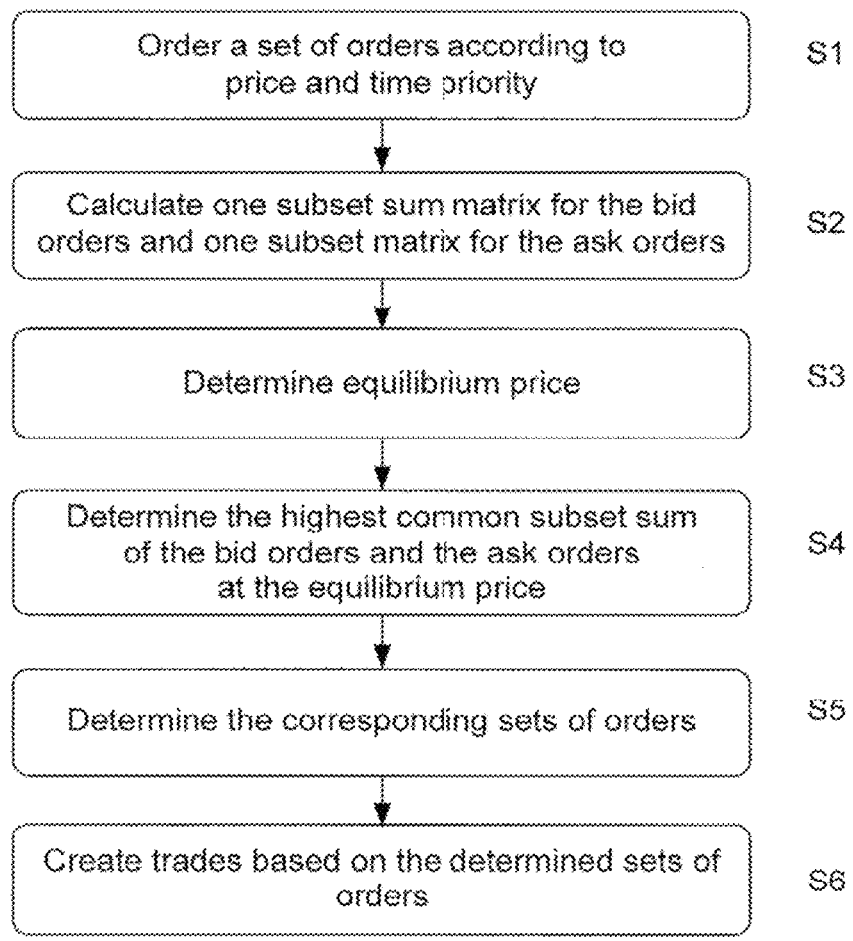
FIG. 9 illustrates a process of matching orders.

The first step in the process for calculating the equilibrium price and matching the orders involve ordering a set of orders according to price, step S1 of FIG. 9. The orders at the same price may be ordered according to the time the orders were received by the automated trading system. If the trading module is implemented using a plurality of submodules as shown in FIG. 3, the subset sum module 14 may receive the bid orders 5a and the ask orders 5b from the order book 6 and may order the orders according to price. The subset sum module 14 may also order the orders according to the time they were received. Alternatively, another module can carry out the ordering of the orders. The subset sum module 14 then proceeds to create the subset sum matrices, step S2 of FIG. 9. One matrix is created for the bid orders and one matrix is created for the ask orders. The subset sum module 14 calculates the matrices by creating larger and larger sets in the order of increasing or decreasing price. In some embodiments, the subset sun calculations for the bid orders and the subset sum calculations for the ask orders are performed in parallel by two processors, as shown in FIG. 9. Alternatively, one processor may carry out the two calculations in series. The subset sum module 14 stores the matrices in memory 16.

The equilibrium price module then calculates the equilibrium price, step S3, by collating all the orders willing to trade at each possible prices and calculating the turnover and the imbalance at each possible prices. For calculating the turnover, the equilibrium calculation module makes a call to the common sum determination module 15. The equilibrium calculation module specifies the sets of orders between which the highest common sum need be found and the common sum determination unit determines the corresponding rows in the matrices and determines the highest common sum and returns this to the equilibrium calculation module. Once the equilibrium price has ben calculated, the equilibrium price is stored and used by the order matching module 13 as an input for calculating matching orders and creating trades. The order matching module 13 makes a call to the common sum determination module to determine the highest common subset sum of the bid order and the ask orders, step S4. The common sum determination module performs this step by finding the highest common sum in the last row of the matrices. The order matching module then identifies the subsets for which the highest common sum is the sum, step S5, and creates the trades between the orders of the sets at step S6. If the order book includes a large number of trades, several order sets may sum to the highest common sum. A method for finding a subset that sums to a particular sum, according to some embodiments of the invention, will be described below with respect to FIG. 15. The process of FIG. 15 always chooses the same order set given the same matrix or table.

Figure 10:
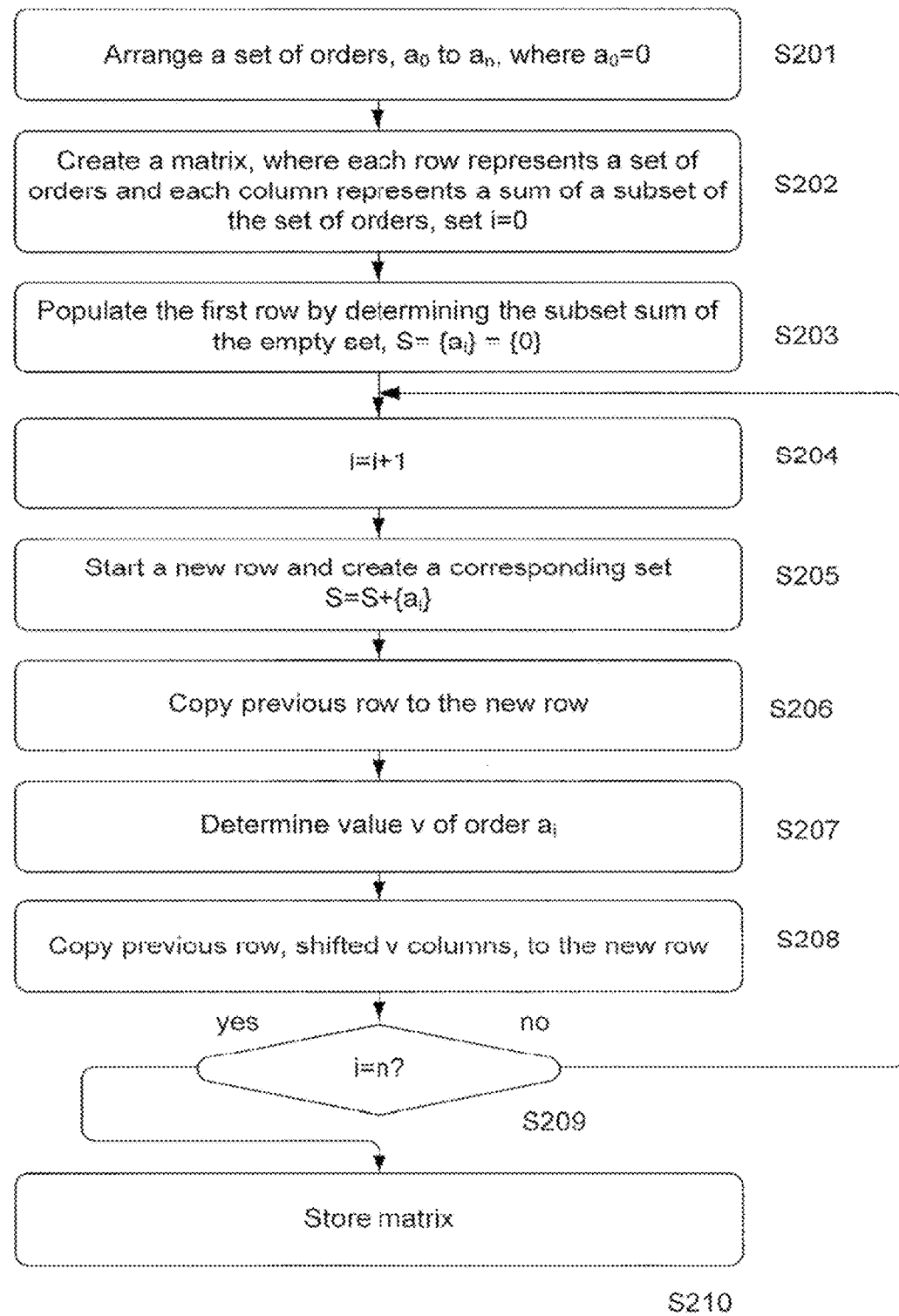
FIG. 10 illustrates a process of solving the subset sum problem for AoN orders received in the trading system.

The calculation of the subset sum matrix, step S2 of FIG. 9, will now be described in more detail with respect to FIG. 10. The subset sum nodule 14 first arranges the set of order, in an array, step S201, with the first element corresponding to an order of volume 0. The subset sum module then creates a matrix, where each row represents a set of orders and each column represents a sum of a subset of the set of orders at step S202. It further sets the parameter i, representing an order in the array, to 0, at step S202. The first row of the matrix is then populated, step S203, by creating a first set $S_0$ with the first order in the array, $a_0$, and populating the first row by setting the first element to 1 and all the other elements to zero to show that the only subset sum of the empty set is zero. The parameter representing an order in the array, i, is then increased by 1 at step S204. A new row is created at step S205 and a new set corresponding to the row is created by adding the order identified by the value of parameter i to the set. The first row is then populated by copying the previous row, step S206, determining the volume of the new order added to the set, S207, and adding a copy of the previous row, shifted a number of positions corresponding to the volume of the new order, step S208. It is then determined at step S209 if all the orders in the array have been considered. If not, steps S204 to S209 are repeated for the next set of orders created by adding the next order in the array to the current set of orders. When it is determined at step S209 that the current set comprises all orders in the array, the process roves on to step 2010 and the matrix is stored in memory 16.

FIGS. 8a and 8b show the subset sum tables recalculated with the orders of FIGS. 6a and 6b ordered according to price and the corresponding matrices are provided below.

$$G_b = \begin{pmatrix} 1 & 0 & 0 & 0 & 0 & 0 & 0 & 0 & 0 & 0 & 0 & 0 & 0 \\ 1 & 0 & 1 & 0 & 0 & 0 & 0 & 0 & 0 & 0 & 0 & 0 & 0 \\ 1 & 0 & 1 & 0 & 0 & 0 & 0 & 1 & 0 & 1 & 0 & 0 & 0 \\ 1 & 0 & 1 & 1 & 0 & 1 & 0 & 1 & 0 & 1 & 1 & 0 & 1 \end{pmatrix} \quad \text{Matrix 3}$$

$$G_a = \begin{pmatrix} 1 & 0 & 0 & 0 & 0 & 0 & 0 & 0 & 0 & 0 & 0 & 0 & 0 & 0 \\ 1 & 0 & 0 & 0 & 0 & 1 & 0 & 0 & 0 & 0 & 0 & 0 & 0 & 0 \\ 1 & 0 & 0 & 0 & 1 & 1 & 0 & 0 & 0 & 0 & 1 & 0 & 0 & 0 \\ 1 & 0 & 0 & 1 & 0 & 1 & 1 & 0 & 1 & 1 & 0 & 1 & 0 & 0 & 1 \end{pmatrix} \quad \text{Matrix 4}$$

It is clear from the matrices that the last line of each matrix is still the same as in the corresponding matrix calculated without ordering the orders according to price. However, it is also clear that the other rows are different. For example, row 3 of matrix 3 now provides a solution to the subset sum problem for the bid order set {2, 7} needed to calculate the turnover at prices 10200p and 10100p and row 3 of matrix 4 provides a solution to the subset sum problem for ask order set {5, 6} needed to calculate the turnover at price 9800p.

As described with respect to FIG. 9, once the matrices have been constructed, the equilibrium price is determined at step S3. The process of determining the equilibrium price will now be described in more detail with respect to FIG. 11. The process of determining the equilibrium price may be performed by the equilibrium price calculation module 12. The equilibrium price calculation module may also make calls to other modules. The equilibrium price is normally set to the price that produces the highest turnover. However, if the highest turnover can be obtained at a number of prices, a set of rules can be used to find the optimum equilibrium price. At step S301, all the possible prices are determined. Using the example of FIG. 7, the possible prices are 9700p, 9800p, 9900p, 10000p, 10100p, 10200p and 10300p. It is then determined which sets of hid orders and which sets of ask orders are willing to trade at each price at step S302.

The turnover and the imbalance for the sets are then determined at step S303. This may be performed by the equilibrium price calculation module 12 forwarding information about the sets willing to trade at each price to the common sum determination module 15, and the common sum determination module 15 extracting the values of the rows corresponding to the specified sets from the two subset sum matrices, finding the highest common sum and returning this value to the equilibrium price calculation module 12. In more detail, to calculate the turnover at price 10200p, the highest common sum of the bid order set {0, 2} and the full ask order need to be determined. The common sum determination module 15 may receive sets {0, 2} and {6, 5, 3} as input from the equilibrium price calculation module 12 and, in response, analyse the first row of the subset sum matrix for the bid orders and the last row for the subset sum matrix for the ask orders to determine that the only common sum is 0. To calculate the turnover at price 10200p, the equilibrium price calculation module 12 specifies sets {0, 2, 7} and {6, 5, 3} to the function provided by the common sum determination module 15 and the common sum determination module 15 accesses the matrices and determines the highest common sum between the third row of the bid matrix, representing set {2, 7} and the last row of the ask matrix, representing the full set. It is realised that the highest common sum is 9 and that this would therefore be the turnover at price 10200p. This is also true at price 10100p. At price 10000p, all the bid orders would accept the price and so the last row of the bid matrix is compared to the last row of the ask matrix. The turnover is still 9. The same is true at price 9900p. At price 9800p, all the bid orders would accept the price, but only ask orders 5@9800, and 6@9700p would accept the price. To find the highest common sum for these orders, the last line of the bid matrix is compared to the third row of the ask matrix and it is realised that the highest sum is 6. All the rows of the turnover column of FIG. 7 can therefore be populated by referring to the subset sum matrices.

The imbalance is then calculated based on the turnover. The imbalance can be calculated in different ways. The imbalance is typically calculated as the difference in volume between the bid orders and the ask orders without volume conditions that remain after the orders have been matched. In other words, the imbalance is the volume of orders without volume conditions that are not allowed to trade. Since it is difficult to define the imbalance for minimum volume condition orders, such as AoN orders, orders comprising minimum volume condition orders are not included in the final value of the imbalance, according to some implementations. However, if some of the orders with minimum volume conditions are allowed to trade, the orders indirectly affect the imbalance since it reduces the remaining volume of orders on the other side. Since all the orders described with respect to FIGS. 6 and 7 are AoN orders, the imbalance is set to zero it each row of FIG. 7. However, as example, if the orders did not have minimum volume conditions, the imbalance in the first row would be −12 and the imbalance in the last row would be 6.

The process then proceeds to step S304 and the equilibrium price calculation module determines the rows with the highest turnover. If the highest turnover can only be achieved at one price, this price is set as the equilibrium price at step S305. However, if the highest turnover can be achieved at more than one price, the process proceeds to step S306 and the rows with the highest turnover are noted. In FIG. 7, the highest turnover is 9 and this turnover would be achieved at four different prices, 10200p, 10100p, 10000p and 9900p. These rows then have to be analysed according to a number of rules to find the optimum equilibrium price.

The rows are first analysed to find the lowest absolute value of imbalance. At step S307, it is determined if one row has a lower absolute value of imbalance than the other rows. If one of the rows has a lower absolute value of imbalance, the process proceeds to step S305 and the price of the row having the absolute value of imbalance is set as the equilibrium price. However, if more than one of the rows with the highest turnover have the lowest absolute value of imbalance at step S307, the rows with the same low absolute value of imbalance are noted at step S308. In FIG. 7, all the rows have the same absolute value and the process would therefore proceeds to step S308.

At step S309, it is checked if all the rows with the same low absolute value of imbalance have a positive imbalance. If all the rows have a positive imbalance, the row with the highest price is determined at step S310 and the price of this row is set to the equilibrium price at step S305. If, instead, all the rows do not have a positive imbalance, it is checked if all the rows have a negative imbalance at step S311. If all the rows have a negative imbalance, the row with the lowest price is determined at step S312 and the price of this row is set as the equilibrium price at step S305. A row would have a positive imbalance if the volume of bid orders without minimum volume conditions exceeds the volume of ask orders without minimum volume conditions and as a result, not all of the bid orders without minimum volume conditions are met. A row would have a negative imbalance if the volume of ask orders without minimum volume conditions exceeds the volume of bid orders without minimum volume conditions and as a result, one or more ask orders without minimum volume conditions is left in the order book 6 after the auction phase. If all the rows do not have a positive imbalance, step S309, or a negative imbalance, step S311, it is checked whether all the rows have a zero imbalance at step S313. If they do, the row with the midpoint price is determined at step S314 and the equilibrium price is set to the price of this row at step S305. In FIG. 7, all the rows have a zero imbalance since all the orders are AoN orders and the prices is therefore set at step S305 to the midpoint price which is 10000p. If the rows do not all have a positive imbalance, a negative imbalance or a zero imbalance, the rows must have the same absolute values of the imbalance but some values must be positive and some values must be negative. In that case, the row with the highest price out of the rows with a positive imbalance is determined at step S315 and the equilibrium price is set to the price of that row at step S305.

Figure 11:
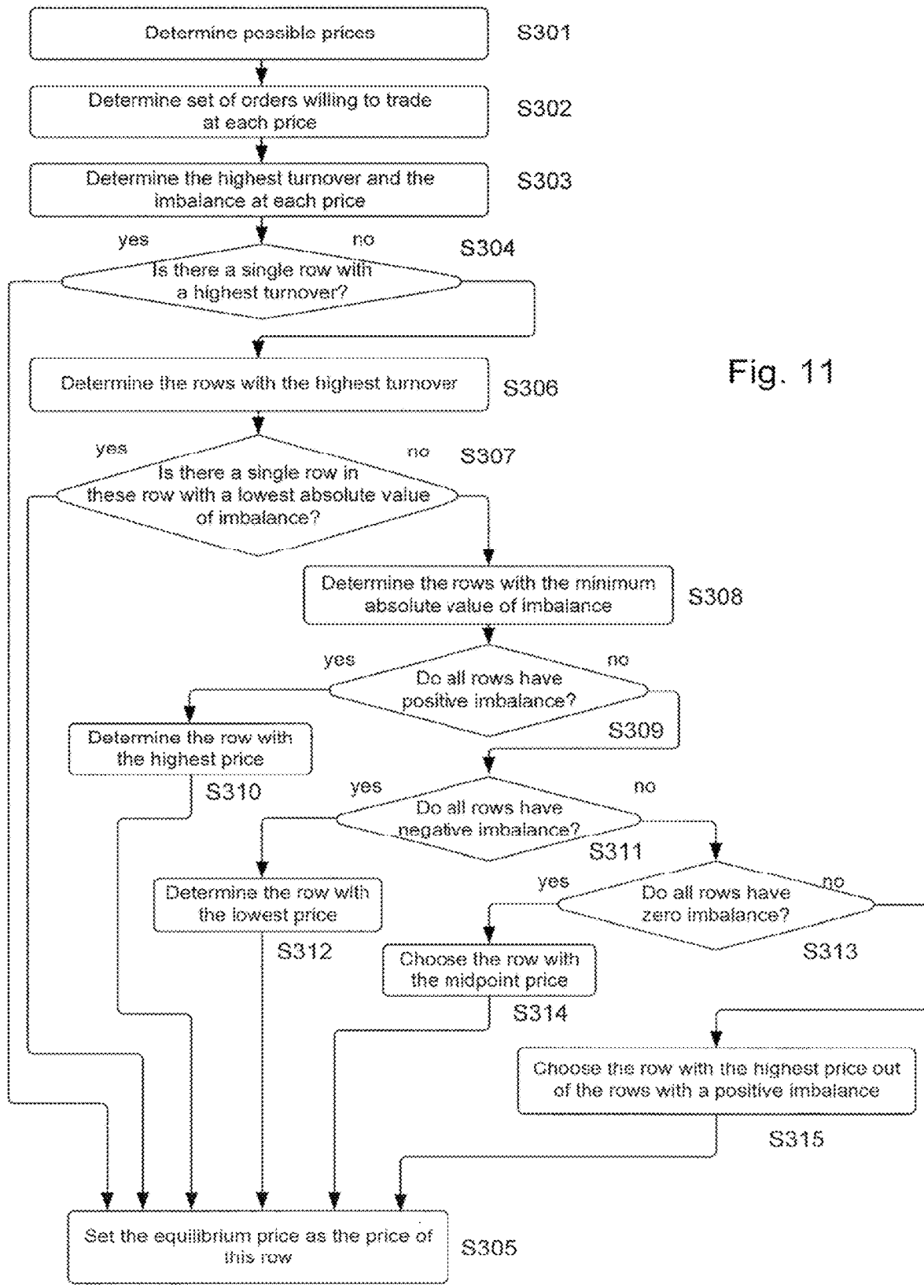
FIG. 11 illustrates a process of determining an equilibrium price for a set of orders.

The process for determining the equilibrium price, described with respect to FIG. 11, ensures that the price that maximises turnover is selected. It also guarantees that orders that are more generously priced than the equilibrium price are completely traded.

It is clear from the table of FIG. 7, that the turnover at the equilibrium price of 10000p is 9. Moreover, it is clear from Matrix 3 and Matrix 4 that the lowest row of the bid order matrix with a subset sum corresponding to a volume of 9 is the third row corresponding to set {2, 7} and that the lowest row of the ask matrix with a subset sum corresponding to a volume of 9 is the third row corresponding to subset {6, 5}. A trade is therefore created between these orders.

Some trading systems allow all types of minimum volume condition orders and not just AoN orders to be submitted to call auctions. With reference to FIG. 12, the order book 6 may have received a bid order for volume 6, willing to trade a minimum of 4, an AoN order of 5 and an order for 15 but willing to trade a minimum of 10. Since an AoN order is only willing to trade the full volume, an AoN order can be considered to have a minimum volume condition equal to the full volume as seen in FIG. 12. The methods of FIGS. 9 and 11 for AoN orders are equally applicable to orders comprising minimum volume condition orders. However the process of calculating the subset sum matrix, step S2 of FIG. 9, has to be modified to take into account the minimum volume conditions. A process of calculating the subset sum matrix for any type of minimum volume condition orders will now be described with respect to FIGS. 13 and 14. A process for determining the set of orders corresponding to a particular subset sum comprising any type of minimum volume orders will then be described below with respect to FIG. 15.

The orders are first ordered according to price. The orders at the same prices may be ordered according to the time they were received. Subsequently, as shown in FIG. 13, a table is created and the first row of the table is populated in the same way as for a set of orders only comprising AoN orders. The first set corresponding to the empty set only has a subset sum of 0.

The second set comprises orders $\{0, 6(4)\}$ where $a_i(c_i)$ denotes an order of volume $a_i$ willing to trade with a minimum volume of $c_i$. Since the order $a_i(c_i)=6(4)$ would be willing to trade a volume of 4, a volume of 5 and a volume of 6, the subset sums for this case comprise the subset sums of the previous set, the subset set sums created by adding 4 to the previous sums, by adding 5 to the previous sums and by adding 6 to the previous sums. According to some embodiments, the second row is therefore constructed by adding a copy of the previous row plus a copy of the previous row in which the subset sums are shifted a number of columns equal to the minimum volume that can be traded of the order and then smeared a number of positions corresponding to all the volumes between the minimum volume and the full volume.

The third set is created by adding another element, $a_2=5$, to the set, forming set $\{0, 6(4), 5)\}$. The third row of the matrix is constructed by again copying the previous row, the second row, and adding a copy of the previous row shifted a number of columns equal to the value of the AoN order added to the set.

Finally, the fourth set is created by adding the last order for volume 15 with minimum volume condition 10 to the set. The fourth row is populated by copying the third row and adding a copy of the third row, shifted a number of positions equal to the minimum volume to and smeared a number of positions to cover all the possible volumes between the minimum volume and the full volume 15. Using a more mathematical notation, when an order $a_i$ has a minimum volume conditions $c_i$, a se $S_j=\{a_1(c_1), \ldots, a_j(c_j)\}$ has a subset that sums to j, if $S_{i-1}$ has a subset that sums to j or if $S_{i-1}$ has a subset that sums to j−k, for all k where $c_i \le k \le a_i$.

If $g_{i,j}$ denotes whether a set $S_i$ has a subset that sums to j and $g_{i,j}=1$ indicates that the set $S_i$ has a subset that sums to j and $g_{i,j}=0$ indicates that the set $S_i$ does not have a subset that sums to j, the solution of $g_{i,j}$ is found by noting the initial state $g_{0,i}=1$ for j=0 and $g_{0,i}=0$ for j>0 and using the recursion $$g_{i,j}=1 \textit{ iff}(g_{i-1,j}=1 \text{ or } g_{i-1,j-k}=1) \text{ where } c_i \le k \le a_i \quad \text{Equation 2}$$

The table of FIG. 13 can then be transformed into it corresponding matrix:

Matrix 5

$$G_b = \begin{Bmatrix} 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 1 & 0 & 0 & 0 & 1 & 1 & 1 & 0 & 0 & 0 & 0 & 0 & 0 & 0 & 0 & 0 & 0 & 0 & 0 & 0 & 0 & 0 & 0 & 0 & 0 & 0 \\ 1 & 0 & 0 & 0 & 1 & 1 & 1 & 0 & 0 & 1 & 1 & 1 & 0 & 0 & 0 & 0 & 0 & 0 & 0 & 0 & 0 & 0 & 0 & 0 & 0 & 0 \\ 1 & 0 & 0 & 0 & 1 & 1 & 1 & 0 & 0 & 1 & 1 & 1 & 1 & 1 & 1 & 1 & 1 & 1 & 1 & 1 & 1 & 1 & 1 & 1 & 1 & 1 \end{Bmatrix}$$

Figure 14:
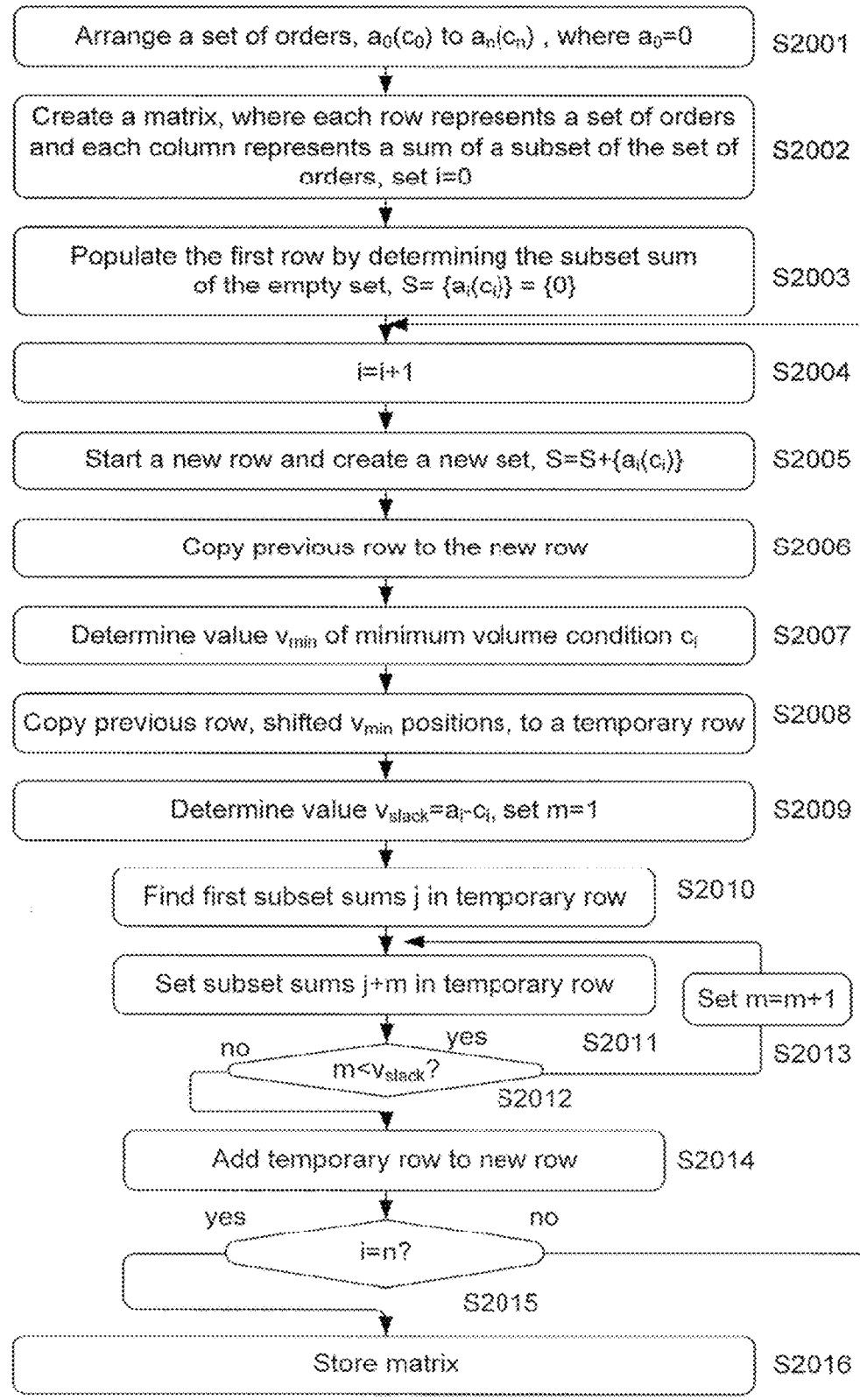
FIG. 14 illustrates a process for solving the subset sum problem for any minimum volume condition orders received by the trading system.

The process of constructing the subset sum matrix, step S2 of FIG. 9, for orders comprising minimum volume orders is summarised with respect to FIG. 14.

The subset sum module 14 first arranges the set of orders in an array, step S2001, with the first element corresponding to an order of volume 0. The subset sum module then creates a matrix, where each row represents a set of orders and each column represents a sum of a subset of the set of orders. It further sets the parameter i, representing an order in the array, to 0, step S2002. The first row of the matrix is then populated, step S2003, by creating a first set $S_i$, with the first order in the array, a and populating the first row by setting the first element to t and all the other elements to zero to show that the only subset sum of the empty set is zero.

The parameter representing an order in the array, i, is then increased by 1 at step S2004. A new row is created at step S2005 and a new set corresponding to the row is created by adding the order identified by the value of parameter i to the set. The new row is then populated by performing a number of copying steps. Firstly, the previous row is copied to the new row at step S2006. Secondly, a temporary row is created, the volume $v_{min}$ of the minimum volume condition $c_i$ of the order is determined at step S2007 and another copy of the previous row, shifted a number of positions equal to the value of $v_{min}$, is added to a temporary row at step S2008. The values of the temporary row then have to be adjusted to take into account all the possible values that can trade between the minimum volume $c_i$ and the full order of $a_i$. To this end, the subset sum values of the temporary row are smeared or spread a number of columns corresponding to the possible volumes of the order. This is done by determining the difference $v_{slack}$ between the full volume $a_i$ and $c_j$ at step S2009. A parameter m, representing the possible values added to the minimum volume condition to form the full volume is set to 1 at this stage. The subset sums i in the temporary row are found in step S2010 and the subset sums j+m are set at step S2011. Since m=1 to start with, this means that the subset sums corresponding to the minimum volume condition plus volume 1 is set at this step. It is then checked at step S2012 if m is smaller than $v_{slack}$ and if it is, m is increased by 1 at step 2013 and step S2011 is repeated. Consequently, the subset sums are spread another step corresponding to the volume created by adding another volume of 1 to the subset sums already in the temporary row. Steps S2011 to S2013 are repeated until m=$v_{slack}$ and the subset sums in the temporary row represent the subset sums that could be obtained by adding every possible volume of the order with the minimum volume condition to the previous row. The temporary row is then added to the new row at step S2014 with a logical OR operation.

The process then proceeds to step S2015 and it is checked whether all rows of the matrix have been populated. In other words, it is checked if all the orders in the array have been considered, in which case the parameter i equals n. If all orders have not been considered, steps S2004 to S2015 are repeated for the next set of orders created by adding the next order in the array to the current set of orders. When it is determined at step S2015 that the current set comprises all orders in the array, the process moves on to step S2016 and the matrix is stored in memory 16.

It should be realised that the process of FIG. 14 can also be used for AoN orders since for an AoN order $a_i=c_i$ and $c_i \le k \le a_i=a_i$. Consequently, the process of FIG. 14 can be used to create a subset sum matrix for a set of orders comprising only AoN orders, some AoN orders and no AoN orders.

Moreover, it should be realised that the second copy may not have to be shifted a number of positions corresponding to the volume of $c_i$, the second copy can be shifted a number of positions corresponding to any possible volume of the order and then bits can be spread in one or both directions as required.

In one embodiment, the subset sum module 14 may use different algorithms for different orders. For example, every time an order is added to a set, it may be determined if the order is an AoN order or a minimum volume condition order. If the order is an AoN order, the module may carry out steps S203 to S207 of FIG. 10. If instead the order is a minimum volume condition order, the module may carry out steps S2004 to S2015 of FIG. 14.

It is contemplated that instead of smearing the subset sums in the temporary row, a new temporary row can be created for each possible volume that is allowed to trade of the volume with the minimum volume condition. All the temporary rows can then be added to the new row with a simple OR operation. Alternatively, the matrix does not have to be obtained by copying. The value of $g_{i,j}$ can also be calculated using the recursions of equation 1 or 2 for each position in the matrix. However, copying the rows and may allow the matrices to be created in a shorter time since fewer operations may have to be performed.

The method of determining the set of orders corresponding to a particular subset sum in the matrix for any type of minimum volume condition orders will now be described with respect to FIG. 15. After a common subset sum has been determined, the order matching module 13 notes the volume V corresponding to the common subset sum at step S501. The order matching module 13 then selects one of the matrices and finds the lowest row where V is a subset sum volume at step S502. Using the example of FIG. 13, if the highest common subset sum is 20, the lowest row where V=20 is the last row. The order matching module 13 then determines the order corresponding to that row at step S503, in this case the order 15(10) with a volume of 15 and a minimum volume condition of 10, and adds that order to the solution set.

The system does not know at this point how much of that order is allowed to trade. This is determined at step S504. At step S504, the order matching module 13 determines the maximum volume $v_{max}$ of the order that can trade, namely the full volume of $a_j$, and the minimum volume $v_{min}$ of the order that can trade, namely the volume of the minimum volume condition $c_i$. The order matching module 13 then analyses at step S505 the columns in the previous row corresponding to sums in the interval $V-v_{max}$ to $V-v_{min}$ and determines the highest sum in the interval. The order matching module may determine the highest sum in the interval in the previous row by simply selecting the highest column number in the interval where a bit is set. This column number represents the volume that is left after the order has been allowed to trade some of its volume. The order matching module 13 may store this column number as $V_{next}$. Another way of expressing the interval analysed to find the highest common sum is $[V-(v_{min}+v_{stack}), V-v_{min}]$, where $v_{slack}$ is the difference between the full volume $v_{max}$ and the minimum volume $v_{min}$. At step S506 the order matching module 13 determines that the order is allowed to trade $V-V_{next}$ of its volume. Using the example above, the columns corresponding to the sums in the interval 20−15=5 to 20−10=10 are analysed and the highest sum in those columns in the previous row is 10. $V_{max}$ is therefore set to 10 and the volume of the order that is allowed to trade is 20−10=10. At step S507 it is determined if $V_{next}$ is zero. If not, V is set to $V_{next}$ at step S508 and steps S502 to S507 are repeated.

Continuing with the example, V is set to $V_{next}$=10 and it is determined at step S502 that the third row is the lowest row where 10 is a subset sum and the order corresponding to this row, order 5, is added to the solution set at step S503. Since order 5 is an AoN order, the interval to analyse in the row immediately above at step S504 only comprises one value, namely 10−5=5. $V_{next}$ is therefore set to 5 and it is determined that AoN order gets to trade volume 10−5=5 at step S505. Since $V_{next}$ is still not zero, V is set to 5 and the process is repeated. It is found that the second row is the lowest row with a subset sum volume of 5 and the order 6(4) corresponding to this row is added to the solution set. The columns in interval 5−6=−1 and 5−4=1 are then analysed in the row immediately above and it is found that the only subset sum in this interval is the subset sum of 0. $V_{next}$ is set to 0 and the volume that is allowed to trade of order 6(4) is calculated as 5−0=0. It is then realised at step S507 that $V_{next}$ is 0 and the solution set is stored at step S509. In this case, the solution set comprises orders 15(10) allowed to trade volume 10, AoN order 5 allowed to completely trade and order 6(4) allowed to trade 5.

The process for finding the subset corresponding to the common subset sum has only been described above for one matrix. It should be realised that the subset corresponding to the subset sum in the other matrix would also need to be found using the same process.

Figure 15:
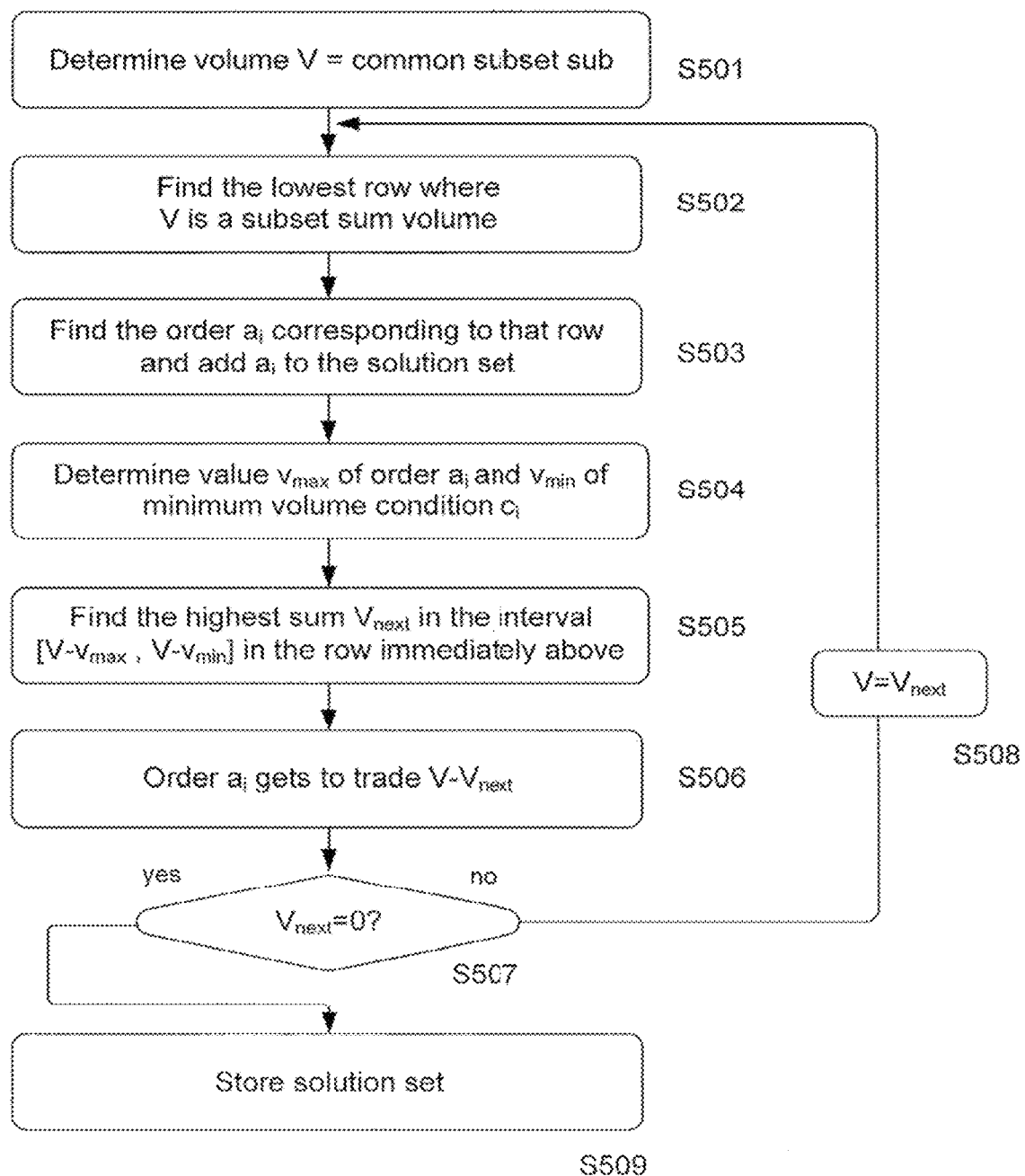
FIG. 15 illustrates a process of determining the subset that sums to a specific sum according to some embodiments of the invention.

It should also be realised that the process described with respect to FIG. 15 is equally applicable to set of orders comprising only AoN order or no AoN orders at all. Moreover, the process can also be used to find the subsets corresponding to the sums used to calculate the turnover to find the equilibrium price. The process can be used to find a subset corresponding to any sum found in the matrix.

The method described with respect to FIG. 15 ensures that orders with a high price and time priority are selected for the solution set. For example, step S502 ensures that an order as low as possible in the sequence is selected. This means that for the bid orders this will be an order with as high a prices as possible and for the ask orders this will be an order with as low a price as possible. Moreover, if there are orders at the same price, the process will select the order that came in the earliest out of two orders of the same volume. Moreover, steps S505 and S506 make sure that as small quantities as possible of an order are matched before proceeding to the next higher row. This also gives an advantage to orders with high price and time priority. The algorithm prefers to match a small amount of an order with low priority in order to include an order with higher priority.

The handling of orders with general volume condition is applicable for orders with no volume conditions as well, since an order without a volume condition has an implicit minimum volume of 1. However, as mentioned above, for performance reasons, orders without volume conditions are not handled directly in the subset sum matrix, but are treated as offsets to the column numbers. Moreover, trading exchanges typically apply rules to the orders that give priority to orders without volume conditions if the orders are at the same price. Exchanges typically want to reward users that enter orders without conditions. Therefore, if an order set contains a number of volume condition orders and additionally some orders without volume conditions with aggregated volume 100, this is handled by adding an offset of 100 to all column numbers in the volume condition order matrix. Suppose that the matrix final row contains hit set in columns 0, 20, 30 and 40. The offset 100 is added and the result is that possible volumes are 0, 100, 120, 130 and 140. This is different from the copy-shift operation used to construct the matrix as described with respect to, for example, FIG. 14 in the sense that the previous volumes are not copied, only shifted.

According to some embodiments, the matrix can be stored by dividing a row in the matrix into blocks of equal size and storing the blocks in tree structures. The block size is configurable, but in one embodiment must be a multiple of a specific number of bits, for example 64 bits. In one implementation, every row is associated with a tree structure where blocks which contains at least one bit are stored. Blocks that do not have any set hits are not stored. This makes storage of sparse rows (i.e. rows with few bits set)

effective. To improve the performance of dense row (i.e. rows with many bits set) storage, the tree structure does not keep block objects directly. Instead, it contains an object which can represent either one block where at least one bit is set, or several consecutive blocks where all bits are set. If the object represents one block with at least one bit set, the object may contain a bit array composed of a number of 64-bit integers where the corresponding bits are set together with an integer which represents the block number. If the object represents a consecutive number of blocks where all bits are set, the object only contains the start block number and the end block number. The objects are stored in a tree according to their start block number. A matrix consists of a number of such trees, one for every row.

The new rows can then be obtained by copying the blocks corresponding to the previous row into a new set of blocks. Creating a temporary set of blocks, copying the previous blocks into the temporary set of blocks and smearing the sums if required and then adding the bits of the temporary set of blocks to the new blocks with a logical OR operation.

Whilst specific examples of the invention have been described, the scope of the invention is defined by the appended claims and not limited to the examples. The invention could therefore be implemented in other ways, as would be appreciated by those skilled in the art.

For example, it should be realised that the invention can also be used for a continuous system. The order matching module may receive a new bid or ask order and may determine whether a matching ask or bid resting order exist in the system. If a matching resting order exists, a trade is created.

Moreover, it should be realised that the arrangement of modules shown in FIG. 3 is just one example and different implementation of the processing arrangement are possible.

Additionally, it should be realised that the orders may not necessarily be received from a number of member terminals over a network. Orders may also be entered into the trading system, for example by officials associated with the trading system, using terminals connected to the trading system or directly via a user interface of the trading system.

The invention claimed is:

1. An automated data processing system, comprising:
an interface configured to receive a plurality of electronic request instructions over a network from a plurality of networked computer terminals comprising first type request instructions and second type request instructions, wherein the interface is also configured to transmit to the networked computer terminals over the network electronic messages based on executed request instructions;
at least one processor;
at least one memory storing program instructions which when executed by the at least one processor, cause the at least one processor to:
store, during a first time period, the plurality of electronic request instructions in the at least one memory along with a corresponding receipt time indicator when each of the electronic request instructions was received at the interface;
detect expiration of a timer associated with the first time period;
process, during a second time period triggered by the expiration of the timer, the plurality of electronic request instructions from the at least one memory based on the corresponding receipt time indicator;
construct in the at least one memory a first table data structure, where each row in the first table data structure corresponds to a set of the first type request instructions, each column in the row in the first table data structure corresponds to a particular subset of the set of the first type request instructions, and a last row corresponds to a subset of combinations of the first type request instructions, by generating:
a first row of elements set to first values,
a second row of elements by copying the first row of elements and adding a bit-shifted copy of the first row of elements, and
a third row of elements by copying the second row of elements and adding a bit-shifted copy of the second row of elements, and
store the first table data structure in the at least one memory;
construct in the at least one memory a second table data structure, where each row in the second table data structure corresponds to a set of the second type request instructions, each column in the row in the second table data structure corresponds to a particular subset of the set of the second type request instructions, and a last row corresponds to a subset of combinations of the second type request instructions, by generating:
a first row of elements set to first values,
a second row of elements by copying the first row of elements and adding a bit-shifted copy of the first row of elements,
a third row of elements by copying the second row of elements and adding a bit-shifted copy of the second row of elements, and
store the second table data structure in the at least one memory;
determine an optimum common subset combination of the first type request instructions and the second type request instructions based on the respective last rows of the first and second table data structures in the at least one memory;
execute the request instructions for the subset of combinations of the first type request instructions and the subset of combinations of the second type request instructions corresponding to the optimum common subset combination; and
transmit to the networked computer terminals over the network, using the interface, at least one electronic message based on the executed request instructions.

2. The automated data processing system according to claim 1, wherein the program instructions when executed by the at least one processor, cause the at least one processor to execute the program instructions to determine, during a first phase of the second time period, an optimum parameter common to the first type request instructions and the second type request instructions and to determine the optimum common subset combination for the optimum parameter, and during a second phase of the second time period, execute the request instructions for the subset of combinations of the first type request instructions and the subset of combinations of the second type request instructions corresponding to the optimum common subset combination at the optimum parameter.

3. The automated data processing system according to claim 2, wherein the program instructions when executed by the at least one processor, cause the at least one processor to execute the program instructions to determine a common subset combination of the first type request instructions and the second type request instructions for each of a plurality of different parameters common to the first type request instructions and the second type request instructions and select the common subset combination that corresponds to a largest number of the request instructions as the optimum common subset combination at the optimum parameter.

4. The automated data processing system according to claim 3, wherein the program instructions when executed by the at least one processor, cause the at least one processor to execute the program instructions to determine the optimum common subset combination at the optimum parameter.

5. The automated data processing system according to claim 2, wherein the program instructions when executed by the at least one processor, cause the at least one processor to determine the optimum common subset combination of the first type request instructions and the second type request instructions based on the corresponding last rows of the first and second table data structures in the at least one memory when a predetermined condition is specified for at least some of the first type request instructions and the second type request instructions.

6. The automated data processing system according to claim 1, wherein the program instructions when executed by the at least one processor, cause the at least one processor to store each of the first and second table data structures in the at least one memory by partitioning each table data structure row in blocks and storing the blocks in a tree data structure in the at least one memory.

7. The automated data processing system according to claim 6, wherein the blocks are of equal size, and wherein the size is a multiple of a specific number of bits.

8. A method of operating an automated data processing system having an interface, at least one processor, at least one memory storing program instructions which when executed by the at least one processor, cause the at least one processor perform the method comprising:
   receiving at the interface a plurality of electronic request instructions over a network from a plurality of networked computer terminals comprising first type request instructions and second type request instructions;
   transmitting at the interface to the networked computer terminals over the network electronic messages based on executed request instructions;
   storing, by the at least one processor, during a first time period, the plurality of electronic request instructions in the at least one memory along with a corresponding receipt time indicator when each of the electronic request instructions was received at the interface;
   detecting, by the at least one processor, expiration of a timer associated with the first time period;
   processing, by the at least one processor, during a second time period triggered by the expiration of the timer, the plurality of electronic request instructions from the at least one memory based on the corresponding receipt time indicator;
   constructing, by the at least one processor, in the at least one memory a first table data structure, where each row in the first table data structure corresponds to a set of the first type request instructions, each column in the row in the first table data structure corresponds to a particular subset of the set of the first type request instructions, and a last row corresponds to a subset of combinations of the first type request instructions, by generating:
      a first row of elements set to first values,
      a second row of elements by copying the first row of elements and adding a bit-shifted copy of the first row of elements, and
      a third row of elements by copying the second row of elements and adding a bit-shifted copy of the second row of elements, and
   storing, by the at least one processor, the first table data structure in the at least one memory;
   constructing, by the at least one processor, in the at least one memory a second table data structure, where each row in the second table data structure corresponds to a set of the second type request instructions, each column in the row in the second table data structure corresponds to a particular subset of the set of the second type request instructions, and a last row corresponds to a subset of combinations of the second type request instructions, by generating:
      a first row of elements set to first values,
      a second row of elements by copying the first row of elements and adding a bit-shifted copy of the first row of elements,
      a third row of elements by copying the second row of elements and adding a bit-shifted copy of the second row of elements, and
   storing, by the at least one processor, the second table data structure in the at least one memory;
   determining, by the at least one processor, an optimum common subset combination of the first type request instructions and the second type request instructions based on the respective last rows of the first and second table data structures in the at least one memory;
   executing, by the at least one processor, the request instructions for the subset of combinations of the first type request instructions and the subset of combinations of the second type request instructions corresponding to the optimum common subset combination; and
   transmitting, by the at least one processor, to the networked computer terminals over the network, using the interface, at least one electronic message based on the executed request instructions.

9. The method according to claim 8, further comprising the at least one processor determining, during a first phase of the second time period, an optimum parameter common to the first type request instructions and the second type request instructions and determining the optimum common subset combination for the optimum parameter, and during a second phase of the second time period, execute the request instructions for the subset of combinations of the first type request instructions and the subset of combinations of the second type request instructions corresponding to the optimum common subset combination at the optimum parameter.

10. The method according to claim 9, further comprising the at least one processor determining a common subset combination of the first type request instructions and the second type request instructions for each of a plurality of different parameters common to the first type request instructions and the second type request instructions and selecting the common subset combination that corresponds to a largest number of the request instructions as the optimum common subset combination at the optimum parameter.

11. The method according to claim 10, further comprising the at least one processor determining the optimum common subset combination at the optimum parameter.

12. The method according to claim 9, further comprising the at least one processor determining the optimum common subset combination of the first type request instructions and the second type request instructions based on the corresponding last rows of the first and second table data structures in the at least one memory when a predetermined condition is specified for at least some of the first type request instructions and the second type request instructions.

13. The method according to claim 9, further comprising the at least one processor storing each of the first and second table data structures in the at least one memory by partitioning each table data structure row in blocks and storing the blocks in a tree data structure in the at least one memory.

14. The method according to claim 13, wherein the blocks are of equal size, and wherein the size is a multiple of a specific number of bits.

15. A non-transitory, computer-readable storage medium storing computer instructions which when executed by at least one processor causes the at least one processor to perform the following method:
   receiving by way of an interface a plurality of electronic request instructions over a network from a plurality of networked computer terminals comprising first type request instructions and second type request instructions;
   transmitting at the interface to the networked computer terminals over the network electronic messages based on executed request instructions;
   storing, during a first time period, the plurality of electronic request instructions in at least one memory along with a corresponding receipt time indicator when each of the electronic request instructions was received at the interface;
   detecting expiration of a timer associated with the first time period;
   processing, during a second time period triggered by the expiration of the timer, the plurality of electronic request instructions from the at least one memory based on the corresponding receipt time indicator;
   constructing in the at least one memory a first table data structure, where each row in the first table data structure corresponds to a set of the first type request instructions, each column in the row in the first table data structure corresponds to a particular subset of the set of the first type request instructions, and a last row corresponds to a subset of combinations of the first type request instructions, by generating:
      a first row of elements set to first values,
      a second row of elements by copying the first row of elements and adding a bit-shifted copy of the first row of elements, and
      a third row of elements by copying the second row of elements and adding a bit-shifted copy of the second row of elements, and
   storing the first table data structure in the at least one memory;
   constructing in the at least one memory a second table data structure, where each row in the second table data structure corresponds to a set of the second type request instructions, each column in the row in the second table data structure corresponds to a particular subset of the set of the second type request instructions, and a last row corresponds to a subset of combinations of the second type request instructions, by generating:
      a first row of elements set to first values,
      a second row of elements by copying the first row of elements and adding a bit-shifted copy of the first row of elements,
      a third row of elements by copying the second row of elements and adding a bit-shifted copy of the second row of elements, and
   storing the second table data structure in the at least one memory;
   determining an optimum common subset combination of the first type request instructions and the second type request instructions based on the respective last rows of the first and second table data structures in the at least one memory;
   executing the request instructions for the subset of combinations of the first type request instructions and the subset of combinations of the second type request instructions corresponding to the optimum common subset combination; and
   transmitting to the networked computer terminals over the network, using the interface, at least one electronic message based on the executed request instructions.

16. The non-transitory, computer-readable storage medium according to claim 15, storing further computer instructions which when executed by the at least one processor causes the at least one processor to determine, during a first phase of the second time period, an optimum parameter common to the first type request instructions and the second type request instructions and to determine the optimum common subset combination for the optimum parameter, and during a second phase of the second time period, execute the request instructions for the subset of combinations of the first type request instructions and the subset of combinations of the second type request instructions corresponding to the optimum common subset combination at the optimum parameter.

17. The non-transitory, computer-readable storage medium according to claim 15, storing further computer instructions which when executed by the at least one processor causes the at least one processor to determine a common subset combination of the first type request instructions and the second type request instructions for each of a plurality of different parameters common to the first type request instructions and the second type request instructions and select the common subset combination that corresponds to a largest number of the request instructions as the optimum common subset combination at the optimum parameter.

18. The non-transitory, computer-readable storage medium according to claim 17, storing further computer instructions which when executed by the at least one processor causes the at least one processor to determine the optimum common subset combination at the optimum parameter.

19. The non-transitory, computer-readable storage medium according to claim 15, storing further computer instructions which when executed by the at least one processor causes the at least one processor to determine the optimum common subset combination of the first type request instructions and the second type request instructions based on the corresponding last rows of the first and second table data structures in the at least one memory when a predetermined condition is specified for at least some of the first type request instructions and the second type request instructions.

20. The non-transitory, computer-readable storage medium according to claim 15, storing further computer instructions which when executed by the at least one processor causes the at least one processor to store each of the first and second table data structures in the at least one memory by partitioning each table data structure row in blocks and storing the blocks in a tree data structure in the at least one memory.

* * * * *